(12) United States Patent
Paterson et al.

(10) Patent No.: US 10,437,332 B1
(45) Date of Patent: Oct. 8, 2019

(54) SYSTEM AND METHOD FOR EMOTIONAL CONTEXT COMMUNICATION

(71) Applicant: UIPCO, LLC, San Antonio, TX (US)

(72) Inventors: Kevin Glynn Paterson, San Antonio, TX (US); Jordan A. Newmark, Fair Oaks Ranch, TX (US)

(73) Assignee: United Services Automobile Association, San Antonio, TX (US)

( * ) Notice: Subject to any disclaimer, the term of this patent is extended or adjusted under 35 U.S.C. 154(b) by 234 days.

(21) Appl. No.: 15/283,998

(22) Filed: Oct. 3, 2016

Related U.S. Application Data

(60) Provisional application No. 62/248,712, filed on Oct. 30, 2015.

(51) Int. Cl.
| | | |
|---|---|---|
| G06F 3/01 | (2006.01) | |
| G06F 17/24 | (2006.01) | |
| G06F 3/16 | (2006.01) | |
| H04L 12/58 | (2006.01) | |

(52) U.S. Cl.
CPC .............. *G06F 3/015* (2013.01); *G06F 3/16* (2013.01); *G06F 17/24* (2013.01); *G06F 17/241* (2013.01); *H04L 51/08* (2013.01)

(58) Field of Classification Search
CPC ....... A61B 5/165; A61B 5/0476; H04W 4/21; H04W 4/206; H04L 67/12; H04L 51/08; G06F 3/015; G06F 3/16; G06F 17/24; G06F 17/241
See application file for complete search history.

(56) References Cited

U.S. PATENT DOCUMENTS

| | | | | |
|---|---|---|---|---|
| 6,292,688 B1 * | 9/2001 | Patton | ................ | A61B 5/04842 600/300 |
| 10,275,583 B2 * | 4/2019 | Leuthardt | ................ | H04W 4/21 |
| 2008/0294741 A1 * | 11/2008 | Dos Santos | .......... | G06Q 10/107 709/206 |
| 2010/0114237 A1 * | 5/2010 | Giftakis | ................ | A61B 5/0476 607/45 |
| 2010/0302254 A1 * | 12/2010 | Min | ....................... | G06F 17/214 345/473 |
| 2012/0047447 A1 * | 2/2012 | Haq | ..................... | G06F 3/04847 715/752 |

(Continued)

*Primary Examiner* — Rodney Amadiz
(74) *Attorney, Agent, or Firm* — Fletcher Yoder, P.C.

(57) ABSTRACT

The present disclosure relates to systems and methods that enable inclusion of emotional context in indirect communications based on measured physiological signals of a user. A method of operation of a human mind interface (HMI) system includes determining that a user is preparing an indirect communication, and receiving a measurement of physiological signals related to the user's brain activity. The method includes identifying, within a plurality of stored brain patterns, a brain pattern that corresponds to the measurement received from the physiological sensors; determining, within a plurality of stored emotional states, an emotional state that is linked to the identified brain pattern; and determining, within a plurality of stored expressions, an expression that is linked to the determined emotional state. The method includes augmenting the indirect communication of the user with the determined expression to yield an augmented indirect communication, and sending the augmented indirect communication to the recipient.

20 Claims, 2 Drawing Sheets

(56) References Cited

U.S. PATENT DOCUMENTS

| | | | |
|---|---|---|---|
| 2014/0195619 A1* | 7/2014 | Hodjat | H04L 51/08 709/206 |
| 2014/0221866 A1* | 8/2014 | Quy | H04W 4/21 600/544 |
| 2015/0332088 A1* | 11/2015 | Chembula | G06K 9/00 382/203 |
| 2015/0338917 A1* | 11/2015 | Steiner | H04L 9/3231 345/156 |
| 2016/0143554 A1* | 5/2016 | Lim | A61B 5/0478 600/383 |

* cited by examiner

SYSTEM AND METHOD FOR EMOTIONAL CONTEXT COMMUNICATION

CROSS REFERENCE TO RELATED APPLICATION

This application claims priority to and the benefit of U.S. Provisional Application No. 62/248,712, entitled "SYSTEM AND METHOD FOR EMOTIONAL CONTEXT COMMUNICATION," filed Oct. 30, 2015, which is hereby incorporated by reference in its entirety for all purposes.

BACKGROUND

The present disclosure relates generally to systems and methods that enable the inclusion of emotional context in indirect communications based on measured physiological signals of a user.

The human nervous system includes a large number of neurons that cooperate with one another to enable mental activities. By analyzing the communications between these neurons while a person performs various tasks, patterns may be observed and associated with particular mental activities and moods of the person. Electroencephalograph (EEG) devices include a number of electrodes that are typically positioned at locations along the scalp and face of a person and can measure patterns of voltage fluctuations that result from electrical communications between the person's neurons. For example, a person connected to an EEG device may have a particular pattern of electrical activity that can be identified when the patient thinks of a particular object, place, movement, or emotion. As such, an EEG device can be utilized as a computer input device, whereby patterns of voltage fluctuations of a user's brain may be translated into computer commands or actions (e.g., mouse movements, keyboard strokes), which is particularly useful for computer users that may not be capable of using traditional computer input devices.

Humans have long engaged in indirect communications, such as written communications, in which the emotional state of the author may be difficult to determine with any certainty. At times, the ambiguity that results from a misinterpretation of the emotional context of a communication results in a humorous misunderstanding or may open the door to desired subtleties where the author prefers his or her motives to be occluded. However, in other contexts, the misinterpretation of the emotional context, for example, a literal interpretation of a sarcastic or humorous statement, often proves detrimental to all parties involved.

BRIEF DESCRIPTION

Certain embodiments commensurate in scope with the originally claimed subject matter are summarized below. These embodiments are not intended to limit the scope of claimed embodiments, but rather these embodiments are intended only to provide a brief summary of possible forms of the present embodiments. Indeed, the present disclosure may encompass a variety of forms that may be similar to or different from the embodiments set forth below.

In an embodiment, a human mind interface (HMI) device includes at least one physiological sensor configured to measure physiological signals related to brain activity of a user. The device includes a memory circuitry configured to store instructions, brain patterns of the user, emotional states of the user, and expressions of the user, wherein the brain patterns are linked to the emotional states and the emotional states are linked to the expressions. The device also includes processing circuitry communicatively coupled to the at least one physiological sensor and the memory circuitry and configured to execute the instructions stored in the memory circuitry. These instructions cause the processor to: determine that the user is preparing an indirect communication to a recipient; receive, from the at least one physiological sensor, a measurement of physiological signals related to the brain activity of the user; identify, within the brain patterns stored in the memory circuitry, a brain pattern that corresponds to the measurement received from the physiological sensors; determine, within the emotional states stored in the memory circuitry, an emotional state that is linked to the identified brain pattern; determine, within the expressions stored in the memory circuitry, an expression that is linked to the determined emotional state; modify the indirect communication of the user with the determined expression to yield an augmented indirect communication; and send the augmented indirect communication to the recipient.

In another embodiment, a method of operation of a human mind interface (HMI) system includes determining, via a processor of a HMI device, that a user is preparing an indirect communication to a recipient, and receiving, from a physiological sensor of the HMI device, a measurement of physiological signals related to the brain activity of the user. The method includes identifying, within a plurality of brain patterns stored in a memory of the HMI device, a brain pattern that corresponds to the measurement received from the physiological sensors; determining, within a plurality of emotional states stored in the memory of the HMI device, an emotional state that is linked to the identified brain pattern; and determining, within a plurality of expressions stored in the memory of the HMI device, an expression that is linked to the determined emotional state. The method includes augmenting, via the processor of the HMI device, the indirect communication of the user with the determined expression to yield an augmented indirect communication; and sending, via the processor of the HMI device, the augmented indirect communication to the recipient.

In another embodiment, a method of using a human mind interface (HMI) device includes measuring, via a physiological sensor of the HMI device, a brain pattern of a user while the user is training the HMI device, and storing and associating the brain pattern with an emotional state in a memory of the HMI device. The method includes receiving, from the user, an expression to be associated with the emotional state, and storing and associating the expression with the emotional state in the memory of the HMI device. The method includes measuring, via the physiological sensor of the HMI device, the brain pattern of the user while the user is preparing an indirect communication to a recipient after training the HMI device. The method includes determining, via the processor of the HMI device, the emotional state associated the brain pattern in the memory of the HMI device, and determining, via the processor of the HMI device, the expression associated the emotional state in the memory of the HMI device. The method further includes augmenting, via the processor of the HMI device, the indirect communication using the expression to yield an augmented indirect communication, and sending, via the processor of the HMI device, the augmented indirect communication to a recipient.

DRAWINGS

These and other features, aspects, and advantages of the present disclosure will become better understood when the following detailed description is read with reference to the accompanying drawings in which like characters represent like parts throughout the drawings, wherein.

Figure 3:
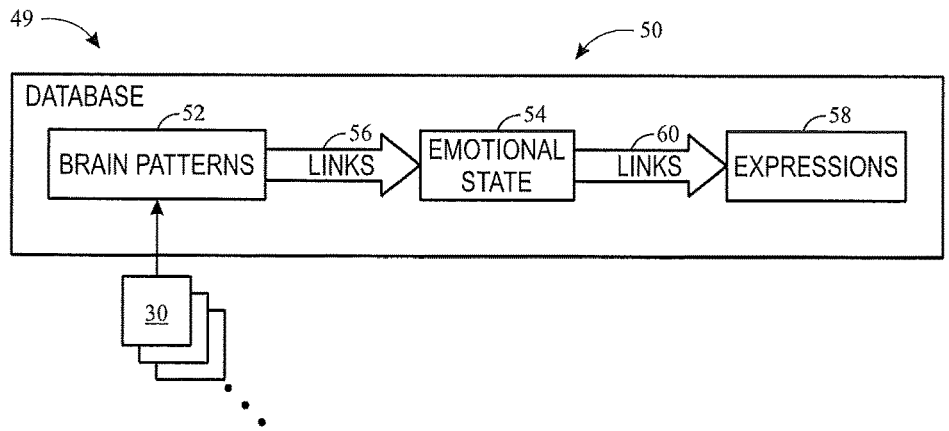
Figure 4:
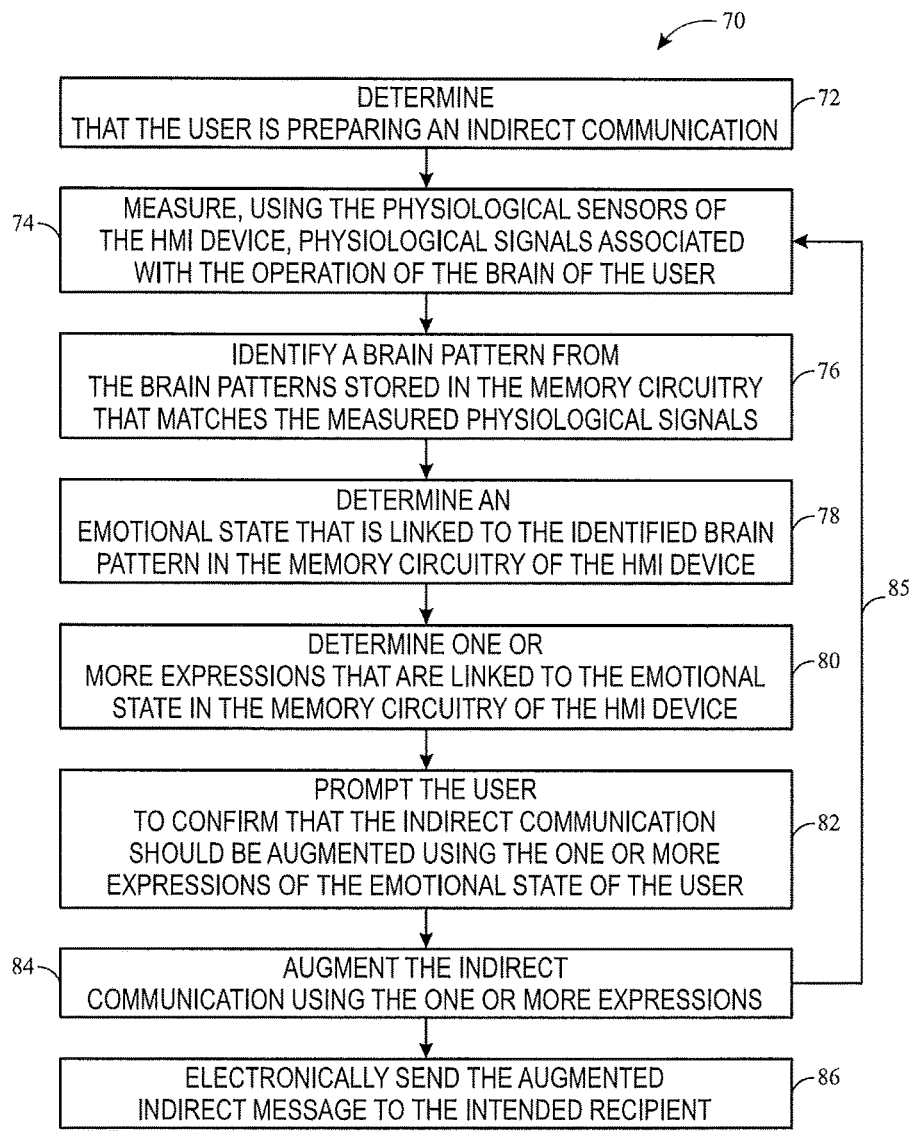

FIG. 3 is a schematic representation of a system including a database that associates measured physiological signal patterns of a user with the emotional state of the user, and associates the emotional states of the user with one or more expressions of these emotional states, in accordance with embodiments of the present technique; and FIG. 4 is a flow diagram illustrating a method whereby the HMI device may be used to augment an indirect communication with emotional context.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, "indirect communication" refers to any form of electronic communication (e.g., email, text messages, chat sessions, internet posts, social media messages, telephone calls) in which the emotional state of the person communicating may be imperfectly conveyed. As used herein, "physiological signals" include any measurable physiological activity that is associated with the operation of a user's brain, including electrical signals (e.g., brain waves), magnetic signals, optical signals, sound signals, chemical signals, and so forth. As used herein, a "brain pattern" refers an identifiable set of measured physiological signals that can be reproduced by a user. As used herein, "projecting" may reference a physical, electrical, or chemical activity (e.g., emoting, feeling, expressing) on the part of a user that reflects a particular emotion in a manner that generates a particular brain pattern. As used herein, a "trigger" refers to a particular stimuli (e.g., auditory, visual, tactile) provided by the device to a user to cause the user to project a particular emotion such that the corresponding brain pattern of the user may be measured and identified.

Present embodiments are directed toward systems and methods that enable the inclusion of emotional context in indirect communications based on measured physiological signals of a user. More specifically, present embodiments provide a system that is trained to associate a user's brain patterns with particular emotional states and particular expressions of these emotional states, and subsequently enables the user to augment their indirect communication with appropriate expressions in response to these detected brain patterns during drafting. As discussed below, the communication may be augmented in a number of different ways to clarify or emphasize the emotional state of the communicator. Additionally, in certain embodiments, restrictions may be created such that selected types of indirect communications may not be prepared or sent when or until the user is determined to be in particular emotional states.

Human Mind Interface (HMI) Device

Figure 1:
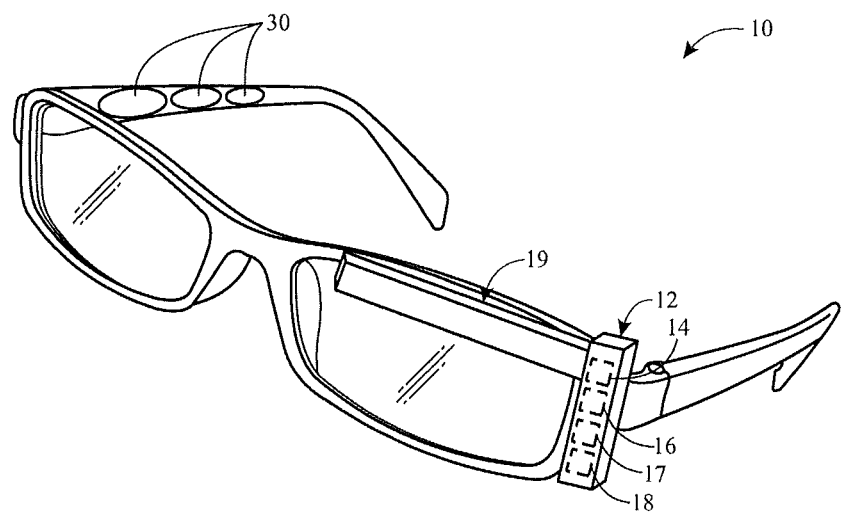
FIG. 1 is a schematic representation of a head-wearable human mind interface (HMI) device, in accordance with embodiments of the present technique.
Figure 2:
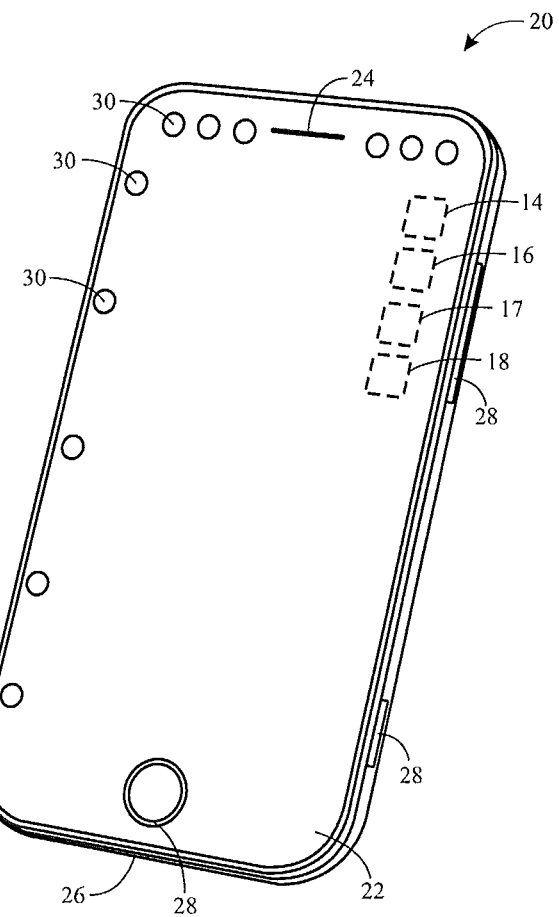
FIG. 2 is a schematic representation of a hand held HMI device, in accordance with embodiments of the present technique.

FIGS. 1 and 2 are perspective views of example embodiments of human mind interface (HMI) devices 10 and 20, in accordance with the present disclosure. More specifically, FIG. 1 illustrates an embodiment of a head-wearable HMI device 10, while FIG. 2 illustrates an embodiment of a hand held HMI device 20. It may be appreciated that these are merely provided as examples and, in other embodiments, other shapes, configurations, and arrangements may be used, in accordance with the present disclosure. In certain embodiments, the HMI device 10 of FIG. 1 may operate in tandem (e.g., via a short-range wireless communication connection) with another electronic device, such as a smart phone, and may utilize one or more components of the smart phone (e.g., processing circuitry, communication circuitry) to provide the disclosed functionality. For example, the HMI device 10 may include one or more sensors that communicate with a smart phone, which processes data from the sensors discussed below. While not the case for the illustrated embodiment, in some embodiments, the HMI device 10 may not include a processor configured for such data processing, which may reduce the overall price of the HMI device 10, because a processor in a separate device (such as a smart phone) is utilized.

The HMI devices 10 and 20 illustrated in FIGS. 1 and 2 are specialized computing devices having memory circuitry and processing circuitry generally capable of storing and executing instructions to enable the functionality described herein. For example, the HMI device 10 of FIG. 1 includes a control unit 12 having memory circuitry 14, processing circuitry 16, communication circuitry 17, sensing circuitry 18, and so forth, which enable operation of the HMI device 10. Similarly, the hand held HMI device 20 of FIG. 2 includes memory circuitry 14, processing circuitry 16, communication circuitry 17, sensing circuitry 18, and so forth, disposed within the body of the HMI device 20 that enable its operation. The HMI devices 10 and 20 of FIGS. 1 and 2 are capable of communicating with other devices (e.g., computers, phones, cellular towers, wireless hosts/clients) via short-range and/or long-range wireless communication circuitry, in accordance with the present disclosure. It may be appreciated that the HMI devices 10 and 20 illustrated in FIGS. 1 and 2 may provide additional functionality and have other uses beyond those discussed herein, for example, as communication devices, processing devices, productivity devices, entertainment devices, or other types of devices.

In addition to the aforementioned circuitry, the embodiment of the HMI device 10 illustrated in FIG. 1 includes an augmented reality (AR) projection system 19 that enables images to be presented as overlaying the view of the user. In certain embodiments, the head-wearable HMI device 10 of FIG. 1 may, additionally or alternatively, include features, such as buttons, touch pads, liquid crystal diodes (LEDs), speakers, microphones, haptic feedback mechanisms, positioning systems, and/or other suitable input and output devices, to enable the functionality described below. In addition to the circuitry contained within, the embodiment of the HMI device 20 illustrated in FIG. 2 includes a touch screen 22, speaker 24, microphone 26, and a physical button 28. The number of features (e.g., speakers 24, microphones 26, one or more buttons 28) may vary in different embodiments. In certain embodiments, the hand held HMI device of FIG. 2 may, additionally or alternatively, include features such as fingerprint readers, light emitting diodes (LEDs), cameras, three-dimensional projection systems, haptic feedback mechanisms, positioning systems, and/or other suitable input and output devices to enable the described functionality.

Additionally, the HMI devices 10 and 20 of FIGS. 1 and 2 include one or more physiological sensors 30 that are capable of measuring physiological signals of the user. More specifically, the physiological sensors 30 of the illustrated HMI devices 10 and 20 are designed to contact a portion of the user's head (e.g., scalp, face) to measure physiological signals associated with the operation of the user's brain. For example, the head-wearable HMI device 10 of FIG. 1 can be worn such that the physiological sensors 30 are positioned along a portion of the user's scalp. The hand held HMI device 20 of FIG. 2 may be temporarily positioned against a portion of the user's face, similar to how a phone is positioned for a private call, such that the physiological sensors 30 are positioned along the face and/or scalp of the user. For the illustrated embodiments, the physiological sensors are electroencephalography (EEG) electrodes that are capable of measuring voltage fluctuations that result from the activity of the user's brain. In other embodiments, the physiological sensors of the HMI device 10 or 20 may include or be coupled to magnetic field sensors, sound sensors, light sensors, chemical sensors, or any other physiological sensors (e.g., invasive or non-invasive) suitable for measuring physiological signals that correlate with the activity of the user's brain. These physiological sensors 30 may be capable of converting measured changes in the physiological signals of the user into electrical signals that can be interpreted and identified as a brain pattern by the processing circuitry 16 of the HMI device 10 or 20 (or a separate device used for processing such data). It should be noted that examples are discussed in the present disclosure with respect to the HMI devices 10 and 20 including integral processing circuitry. However, it should be understood that, in certain embodiments, the actual processing circuitry is resident on a separate device (e.g., a smart phone, laptop, desktop) in communication with the HMI device 10 or 20. Thus, reference to processing by the HMI devices 10 and 20 in following examples could also be done with separate processing devices.

Training the HMI Device

The processing circuitry 16 of the HMI devices 10 and 20 (or other processing circuitry configured to receive data from the HMI devices 10 and 20) illustrated in FIGS. 1 and 2 is capable of receiving measurements from the physiological sensors 30, determining a brain pattern from the measured physiological signals, and associating the pattern with an emotional state of the user and expressions of these emotional states. FIG. 3 illustrates a schematic of an embodiment of a system 49 including an embodiment of a database 50, which may be stored in a device configured to communicate with the HMI device 10 or 20 or in the memory circuitry 14 of the HMI device 10 or 20 itself. The database 50 (which may be located in a cloud, remotely, or on the device 10 or 20 itself) may be populated during user training. The example database 50 illustrated in FIG. 3 includes a table of learned brain patterns 52 and a table of emotional states 54, as well as a collection of links 56 associating the brain patterns and the emotional states of the two tables. The example database 50 also includes a table of expressions of emotional states 58, as well as a collection of links 60 associating the emotional states and the expressions of emotional states stored in the two tables. It may be appreciated that the links 56 and 60 may be stored separately, or stored as fields of the other tables. For example, in certain embodiments, the database 50 may be a relational database, and the links 56 may be reference fields (e.g., pointers, key values) that correlate each unique brain pattern stored in the brain pattern table 52 with a particular emotional state stored in the emotional state table 54.

In certain embodiments, the HMI device 10 or 20 may initially be programmed at the time of manufacturing using statistical analysis data that generally correlates indicated emotional states with measured and identified brain patterns across a group of test subjects. However, since the brain patterns of each user are unique, the HMI device 10 or 20 would likely be trained, or at least tuned, to the particular brain patterns of the user using measurements collected by the one or more physiological sensors 30. As such, the physiological sensors 30 of the HMI device 10 or 20 may occasionally detect a brain pattern of the user that appears to match a pre-programmed brain pattern and prompt the user for confirmation (e.g., "I think you are joking. Is that correct?", "I think you are angry. Is that correct?"), and adjust the link between the brain pattern and the emotional state in response, if necessary. In certain embodiments, the user may actively train the HMI device 10 or 20 by providing input to identify a particular emotional state that they are aware that they are presently projecting such that the processing circuitry 16 of the HMI device 10 or 20 can determine and correlate the brain pattern measured by the physiological sensors 30 with the identified emotional state. Additionally, during training, the HMI device 10 or 20 may collect the brain pattern of the user a number of times as the user projects the target emotion to ensure that the identified brain pattern is stable and reproducible.

In still other embodiments, the HMI device 10 or 20 may prompt the user with particular triggers (e.g., visual, auditory, and tactile stimuli) to generate a particular emotion in the user while measuring the resulting physiological signals. For example, these triggers might include calming triggers (e.g., cat videos, smooth jazz, nature sounds), humor triggers (e.g., jokes, memes, cartoons, physical humor), anger triggers (e.g., political images, objects of contempt, frustrating riddles or puzzles, a mild electrical shock, an apparently malfunctioning user interface), sad triggers (e.g., humane society images and videos, sad songs, images of human suffering), and so forth. In certain embodiments, these triggers may even be selected by the user based on his or her individual tastes, appreciating that not all users experience the same emotional response to the same stimuli. In certain embodiments, the HMI device 10 or 20 may instead be trained by providing the user with a neutral stimuli (e.g., dots, a color pattern, a collection of tones) to which the user is first exposed in a calm, relaxed state, and a brain pattern of the user may be measured to serve as a baseline brain pattern. For such embodiments, the user may again be presented with the neutral stimuli when the use indicates that he or she is experiencing a particular emotional state, so that deviations from the baseline brain pattern can be identified and associated with (e.g., linked to) the indicated emotional states.

Additionally, in certain embodiments, training may also involve the user providing inputs that indicate which expressions the user would like to use to indicate their emotional state (e.g., to form the links 60). For example, in certain embodiments, a user can choose to have the emotional context conveyed by varying text appearance, such as the size (e.g., larger for mad, smaller for calm), color (e.g., red for angry, yellow for cautious, green for calm, blue for sad), capitalization (e.g., all caps for angry, all lower case for sad), emphasis (e.g., bold for angry, italic for sarcastic). In certain embodiments, the emotional context may be literally conveyed using descriptors (e.g., "[mad]", "[excited]", "[playful]", "[sarcastic]") that are positioned within the text of the communication. In certain embodiments, in which the indirect communication may be read to the recipient by a computerized reader, the expressions may include computer encoded instructions for the computerized reader to adjust tone, volume, speed, or other parameters to provide emotional context to the recipient. In certain embodiments, the emotional context may be conveyed using visual aids, such as using background color (e.g., red for angry, green for calm), including emoji (e.g., smiley face for playful, sad face for sad), memes, or pictures. In certain embodiments, certain emotional expressions may be capable of being contained within an indirect communication, while others may be hosted online and hyperlinked or embedded. For example, in the case where the indirect communication is a telephone call, the emotional expressions may include auditory expressions (e.g., tones, beeps, alarms) and/or visual expressions (e.g., colors, pictures, or words presented on a screen in view of the recipient of the call) that help to convey the emotional state of the speaker to the recipient, without significantly interfering with (e.g., interrupting, disrupting, obscuring) the telephone conversation itself. By specific example, the indirect communication may be a telephone call from a user of the HMI device 10 or 20 to a company representative in a call center, and the representative may have a computer display that presents details of currently connected calls. For such embodiments, visual expressions (e.g., colors, pictures, words) may be presented on the display of the representative to convey the emotional state of the caller, as determined by the HMI device 10 or 20, throughout portions of the call, indicating to the representative, for example, when the user is frustrated, distracted, offended, and so forth.

The user may also indicate how they want their indirect communications to be augmented. That is, in certain embodiments, the HMI device 10 or 20 may also enable the user to provide inputs to select how different types of indirect communications may be augmented. For example, the user may instruct the HMI device 10 or 20 to only use emoji expressions when the indirect communication is an informal communication, such as a text message. The user may instruct the HMI device 10 or 20 not to augment certain forms of indirect communications (e.g., business reports, journal articles) but to augment others (e.g., email, text messages). The user may instruct the HMI device 10 or 20 not to use expressions of particular emotions (e.g., expressions of anger, fear, desire) depending on the type of indirect communication or the recipient of the indirect communication. It may be appreciated that these methods of augmenting the indirect communication are not mutually exclusive, and can be combined in various manners, as configured by the user. Indeed, the user may link any number of expressions of emotional state to a single emotional state.

Using the HMI Device

Once training is complete, then the database of FIG. 3 includes particular brain patterns of the user linked to (e.g., associated with) particular emotional states that are, in turn, linked to (e.g., associated with) one or more expressions of emotional states. As such, the HMI devices 10 and 20 of FIGS. 1 and 2 may enable the user to augment different types of indirect communications with emotional expressions without the user having to manually modify the communication to convey emotional context.

FIG. 4 is a flow diagram of an embodiment of a process 70 whereby a user may use the HMI device 10 or 20 to augment an indirect communication. The illustrated process 70 begins with the processing circuitry 16 of the HMI device 10 or 20 determining (block 72) that the user is preparing an indirect communication. In certain embodiments, the HMI device 10 or 20 may further confirm that the indirect communication is of the type that the user desires to have augmented before continuing. In certain embodiments, the user may provide an input (e.g., spoken command, a press of a button 28, a selection of the touchscreen 22) to activate an emotional augmentation mode of the HMI device 10 or 20 to use this functionality.

Throughout the time that the user is drafting the indirect communication, the physiological sensors 30 of the HMI device 10 or 20 measure (block 74) physiological signals associated with the operation of the brain of the user. The processing circuitry 16 may further identify (block 76) a brain pattern from the brain patterns stored in the memory circuitry 14 (e.g., in the brain pattern table 52 of FIG. 3) that matches (e.g., overlaps by a threshold amount) the measured physiological signals. The processing circuitry 16 may then determine (block 78), within the memory circuitry 14, an emotional state (e.g., stored in the emotional state table 54 of FIG. 3) that is linked to the identified brain pattern. The processing circuitry 16 further determines (block 80), within the memory circuitry 14, one or more expressions (e.g., stored in the expression table 58 of FIG. 3) that are linked to the emotional state. In certain embodiments, the processing circuitry 16 may prompt the user (block 82) to confirm that the indirect communication should be augmented using the determined expressions of the detected (e.g., identified and determined) emotional state of the user. The processing circuitry 16 may then augment (block 84) the indirect communication using the one or more expressions of the emotional state of the user, for example, by modifying the size and emphasis of the passage of text being presently drafted. As designated by the arrow 85, the steps of blocks 74, 76, 78, 80, 82, and 84 may be repeated multiple times for lengthy communications, and multiple passages (e.g., phrase, sentence, paragraph, page, section) may be augmented with distinct emotional expressions.

In certain embodiments, the HMI device 10 or 20 may make note of the observed emotional states of the user throughout the drafting of the indirect communication, and then perform the augmentation of the various passages of the indirect communication in a single pass, once the user has completed drafting. In certain embodiments, the HMI device 10 or 20 may include a text analysis tool that can review a portion of the indirect message for particular tone, diction, and/or phasing that tends to connote particular emotions, and may compare the results of this text analysis with the emotional state of the user determined using measurements from the physiological sensors 30 when drafting that portion of the indirect message. For such embodiments, when the emotional state of the user determined by the text analysis tool and the emotional state measured and determined by the HMI device 10 or 20 differ, the HMI device 10 or 20 may prompt the user to resolve the inconsistency, or may update the text analysis tool to properly associate the emotional state determined by the HMI device 10 or 20 with the particular tone, diction, and/or phasing of the user to improve future performance of the HMI device 10 or 20. In certain embodiments, the HMI device 10 or 20 may differently augment the same indirect communication that is being sent to multiple parties of a group (e.g., a coworker and a spouse), wherein there are different levels of emotional sharing within different portions of the group.

In some embodiments, markers (e.g., start and end markers) may be utilized to designate transitions to different emotional states. Such markers and delineated emotional states may be utilized to suppress or present associated expressions. For example, if a user is identified as angry for a time under a threshold (e.g., for one second with a threshold of two seconds), present embodiments may suppress or disregard the identified emotion. However, if the user is identified as angry for two seconds or more, an expression associated with anger may be presented. Utilizing such markers may facilitate provision of a "summary expression." For example, if a user is posting on social media, the various emotions identified during generation of the post may be summarized and provided as an optional "summary expression" for posting along with the substance of the post. As a specific example, present embodiments could recommend an expression that represents the emotional state for which most time was marked and place that expression in the title of the post, if elected by the user.

Finally, the HMI device 10 or 20 electronically sends (block 86) the augmented indirect message to the intended recipient via an appropriate service (e.g., an email service, a short message service (SMS), a social media message service, or another suitable service). In certain embodiments, the HMI device 10 or 20 may present a version of the augmented indirect communication for the user's review, and potential editing, before sending. In certain embodiments, a standard indirect communication application (e.g., a text message application, an email application) may be used by the recipient to view the augmented indirect communication. In other embodiments, the recipient may view the augmented indirect communication using a specialized viewing application that can enable the recipient to have the expressions of the augmented indirect communication presented in different ways (e.g., completely disabled, presented differently than the particular expression style selected by the drafter).

In some embodiments, information regarding identified emotional states may be aggregated and sent to a database (e.g., a cloud database) along with additional information (e.g., contextual information), such as the location of the user and the like. The database may hold and aggregate such information. With respect to the contextual data, it may include user activities (e.g., watching a movie, reading a book, using a product, visiting a resort). Present embodiments may utilize algorithms to search, detect, and associate such data with identified emotional states (e.g., based on time stamps or direct associations). This can be referred to as tagging emotional state segments with additional information (e.g., contextual information). Thus, markers utilized to designate identified periods of emotion may be utilized to create tagged emotion identifiers, which can be utilized with accumulated information from multiple users to identify a community-based emotional state regarding a product or service. For example, readers of a document may be found to have intense emotions (e.g., emotions X, Y, and Z) about the document and/or particular portions of the document. Such information may be used for ratings. For example, present embodiments may identify that visitors to Resort A were found to have stronger joyful emotions than visitors to Resort B, and such information may be provided to users for decision making via a website or device.

In certain embodiments, the HMI device 10 or 20 may also provide additional functionality with respect to the emotional state of the user when preparing indirect communications. For example, in certain embodiments, the HMI device 10 or 20 may be restrict the ability of the user to draft particular types of indirect communications, or to particular parties, based on the emotional state of the user. By specific example, in certain embodiments, the HMI device 10 or 20 may be configured to not allow the user to draft or send particular forms of indirect communication (or indirect communications to particular recipients) if the user is determined to be in a particular emotional state (e.g., no emails to a boss when the user is determined to be angry, no social media messages when the user is determined to be feeling depressed). Alternatively, in certain embodiments, the HMI device 10 or 20 may only allow the user to draft or send particular forms of indirect communication (or indirect communications to particular recipients) when the user is determined to be in a particular emotional state (e.g., no emails unless user is determined to be calm, no social media messages unless the user is determined to be happy).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A human mind interface (HMI) device, comprising:
   at least one physiological sensor configured to measure physiological signals related to brain activity of a user;
   memory circuitry configured to store instructions, brain patterns of the user, emotional states of the user, and text-based expressions of the user, wherein the brain patterns are linked to the emotional states and the emotional states are linked to the text-based expressions; and
   processing circuitry communicatively coupled to the at least one physiological sensor and the memory circuitry and configured to execute the instructions stored in the memory circuitry to cause the processing circuitry to:
   determine that the user is drafting a text-based indirect communication to a recipient;
   receive, from the at least one physiological sensor, a measurement of physiological signals related to the brain activity of the user;
   identify, within the brain patterns stored in the memory circuitry, a brain pattern that corresponds to the measurement received from the physiological sensors;
   determine, within the emotional states stored in the memory circuitry, an emotional state that is linked to the identified brain pattern;
   determine, within the text-based expressions stored in the memory circuitry, a text-based expression that is linked to the determined emotional state;
   modify the text-based indirect communication of the user with the determined text-based expression to yield an augmented text-based indirect communication; and
   send the augmented indirect text-based communication to the recipient.

2. The HMI device of claim 1, wherein the HMI device is a head-wearable HMI device or a hand held HMI device, and wherein the at least one physiological sensor comprises an electroencephalograph (EEG) sensor.

3. The HMI device of claim 1, wherein the HMI device is configured to contact a portion of the user's face and scalp to measure the physiological signals related to the brain activity of the user.

4. The HMI device of claim 1, wherein the HMI device comprises a speaker, a display, an augmented reality (AR) projection system, a haptic feedback mechanism, or a combination thereof.

5. The HMI device of claim 1, wherein the processing circuitry is configured to determine that the user is drafting the text-based indirect communication on a computer input device that is communicatively coupled to the HMI device.

6. The HMI device of claim 1, wherein the text-based expression comprises computer encoded instructions for a computerized reader to adjust a reading tone, a reading volume, a reading speed, or any combination thereof, of the text-based indirect communication.

7. A method of operation of a human mind interface (HMI) system, comprising:
   determining, via a processor of a HMI device, that a user is drafting a text-based indirect communication to a recipient;
   receiving, from a physiological sensor of the HMI device, a measurement of physiological signals related to the brain activity of the user;
   identifying, within a plurality of brain patterns stored in a memory of the HMI device, a brain pattern that corresponds to the measurement received from the physiological sensors;
   determining, within a plurality of emotional states stored in the memory of the HMI device, an emotional state that is linked to the identified brain pattern;
   determining, within a plurality of text-based expressions stored in the memory of the HMI device, a text-based expression that is linked to the determined emotional state;
   augmenting, via the processor of the HMI device, the text-based indirect communication of the user with the determined text-based expression to yield an augmented text-based indirect communication; and
   sending, via the processor of the HMI device, the augmented text-based indirect communication to the recipient.

8. The method of claim 7, wherein determining the text-based expression comprises determining multiple text-based expressions, within the plurality of text-based expressions stored in the memory circuitry, that are linked to the determined emotional state, and augmenting the text-based indirect communication of the user with the determined multiple text-based expressions.

9. The method of claim 7, wherein the text-based expression comprises a text size, a text color, a text capitalization, a text emphasis, or any combination thereof, that is varied in the augmented text-based indirect communication.

10. The method of claim 7, wherein the text-based expression comprises a literal descriptor of the emotional state included in the augmented text-based indirect communication.

11. The method of claim 7, wherein the text-based expression comprises a visual expression or visual aid included in the augmented text-based indirect communication.

12. The method of claim 7, wherein augmenting the text-based indirect communication with the determined text-based expression comprises differently augmenting the text-based indirect communication with the determined text-based expression depending on a type of text-based indirect communication.

13. The method of claim 7, wherein determining the emotional state comprises determining that the emotional state is indicated, in the memory of the HMI device, as an acceptable emotional state before allowing the user to prepare the text-based indirect communication.

14. The method of claim 7, comprising:
   receiving, via a processor of a device of the recipient, the augmented text-based indirect communication from the user; and
   presenting, on an output device of the device of the recipient, the augmented text-based indirect communication, wherein the text-based indirect communication is augmented differently on the output device of the recipient than it is augmented when presented on an output device of the HMI device based on the recipient receiving the text-based indirect communication.

15. The method of claim 7, comprising displaying, on an output device of the HMI device, the augmented text-based indirect communication to the user for review before sending the augmented text-based indirect communication to the recipient.

16. A method of using a human mind interface (HMI) device, comprising:
   measuring, via a physiological sensor of the HMI device, a brain pattern of a user while the user is training the HMI device;
   storing and associating the brain pattern with an emotional state in a memory of the HMI device;
   receiving, from the user, a text-based expression to be associated with the emotional state;
   storing and associating the text-based expression with the emotional state in the memory of the HMI device;
   measuring, via the physiological sensor of the HMI device, the brain pattern of the user while the user is drafting a text-based indirect communication to a recipient after training the HMI device;
   determining, via the processor of the HMI device, the emotional state associated the brain pattern in the memory of the HMI device;
   determining, via the processor of the HMI device, the text-based expression associated the emotional slate in the memory of the HMI device;
   augmenting, via the processor of the HMI device, the text-based indirect communication using the text-based expression to yield an augmented text-based indirect communication; and
   sending, via the processor of the HMI device, the augmented text-based indirect communication to a recipient.

17. The method of claim 16, wherein measuring the brain pattern of the user while the user is training the HMI device comprises providing, via an output device of the HMI, a trigger to induce the emotional state in the user before measuring the brain pattern of the user.

18. The method of claim 16, wherein the trigger is auditory, visual, or tactile.

19. The method of claim 16, wherein measuring the brain pattern of the user while the user is training the HMI device comprises first establishing a baseline brain pattern when the user is in a calm, relaxed state.

20. The method of claim 16, comprising receiving, via an input device of the HMI device, a user input indicating a selection of the emotional state to be associated with the brain pattern that is measured while the user is training the HMI device.

* * * * *